United States Patent [19]

Timor

[11] 4,355,399
[45] Oct. 19, 1982

[54] ADAPTIVE SPREAD SPECTRUM FH-MFSK TRANSMITTER AND RECEIVER

[75] Inventor: Uzi Timor, Haifa, Israel

[73] Assignee: Bell Telephone Laboratories, Incorporated, Murray Hill, N.J.

[21] Appl. No.: 237,540

[22] Filed: Feb. 23, 1981

[51] Int. Cl.³ .......................... H04J 6/00; H04B 7/12
[52] U.S. Cl. ......................................... 375/1; 370/93; 455/62; 375/62
[58] Field of Search .......................... 375/1, 17, 40, 62; 370/92, 93; 455/62, 63, 65; 343/5 PN

[56] References Cited

U.S. PATENT DOCUMENTS

| | | | |
|---|---|---|---|
| 4,066,964 | 1/1978 | Costanza et al. | 375/1 |
| 4,193,030 | 3/1980 | Rabow et al. | 375/1 |
| 4,271,524 | 6/1981 | Goodman et al. | 375/1 |
| 4,320,514 | 3/1982 | Haskell | 375/1 |

OTHER PUBLICATIONS

A. J. Viterbi, "A Processing Satellite Transponder for Multiple Access by Low-Rate Mobile Users", Oct. 23-25 1978, 4th Int Conf. on Digital Satellite Comm., Montreal, Canada, pp. 166-174.

Cooper and Nettleton "A Spread Spectrum Technique for High Capacity Mobile Communication", Nov. 1978, IEEE Transactions on Vehicular Tech., vol. VT-27, No. 4, pp. 264-275.

Grybos et al., "A Receiver Feasibility Study for the Spread Spectrum High Capacity Mobile Radio System", Mar. 22-24 1978, Conference Rec. 28th IEEE Vehicular Tech Conf., Denver Colo., pp. 98-104.

R. C. Williamson et al., "A Satellite Borne SAW Chirp-Transform System for Uplink Demodulation of FSK Communication Signals", Sep. 26-28 1979, 1979 Ultrasonics Symposium Proceedings, New Orleans, La. Paper E-1.

Goodman et al., "Frequency Hopped Multilevel FSK for Mobile Radio", Mar. 4-6, 1980, IEEE 1980 International Zurich Seminar on Digital Communication, pp. A5.1-A5.6.

Primary Examiner—Benedict V. Safourek
Assistant Examiner—Stephen Chin
Attorney, Agent, or Firm—Erwin W. Pfeifle

[57] ABSTRACT

The present invention relates to a transmitter, a receiver and techniques for use in a frequency-hopping, multilevel frequency shift keyed (FH-MFSK) radio system which permits the selective concurrent transmission of one or two encoded frequencies per time slot of the transmitted sequence for improving reception at a receiver experiencing interference from the system transmitters above a predetermined interference threshold level. An alternative arrangement permits all transmitters and receivers to communicate with one another by transmitting a separate one of multiple frequencies in a separate one of an equal number of multiple frequency subbands forming the system frequency band during each time slot for providing flexibility in system design. Combinations of the two arrangements can also be employed.

15 Claims, 5 Drawing Figures

ADAPTIVE SPREAD SPECTRUM FH-MFSK TRANSMITTER AND RECEIVER

BACKGROUND OF THE INVENTION

1. Field of the Invention

The present invention relates to an adaptive spread spectrum frequency-hopped multilevel frequency shift keyed (FH-MFSK) transmitter and receiver and, more particularly, to an adaptive spread spectrum FH-MFSK transmitter and receiver which permit the control of an associated user's performance by the selective simultaneous transmission of one or more encoded frequencies per time slot for the transmitted sequence such that greater system flexibility is provided for choosing operating parameters and/or that the performance of users with the worst reception conditions can be improved but at the expense of those users with better reception conditions resulting in an overall increased system efficiency.

2. Description of the Prior Art

With limited frequency spectrum available, efficient mobile radiotelephony service to a larger number of users requires that many users be able to share the same channel without interfering with each other. The cellular approach, where the area is divided into cells and each user communicates with a base station in his cell, is a widely recognized solution to this problem. An example of a mobile radio system using a hexagonal cell configuration and centrally located base stations transmitting and receiving frequency division multiplexed signals is disclosed in the article "The Advanced Mobile Phone Service" by N. Ehrick in *IEEE Communications Magazine*, Vol. 17, No. 2, Mar. 1979 at pp. 9–15. Other techniques such as space diversity, corner base stations and spread spectrum have been proposed with the goal of increasing the spectrum efficiency in the multipath fading conditions which characterize the mobile radio environment. In this regard see, for example, the articles "A Spread Spectrum Technique for High-Capacity Mobile Communications" by G. R. Cooper et al. in *IEEE Transactions on Vehicular Technology*, Vol. VT-27, No. 4, Nov. 1978 at pp. 264–275; "A Processing Satellite Transponder for Multiple Access by Low-Rate Mobile Users" by A. J. Viterbi in the Conference Record of the *Fourth International Conference on Digital Satellite Communications* at Montreal, Canada on Oct. 23–25, 1978 at pp. 166–174; and "Frequency Hopped Multilevel FSK for Mobile Radio" by D. J. Goodman et al. in the Conference Record of the *IEEE 1980 International Zurich Seminar on Digital Communications*, Mar. 4–6, 1980 at pp. A5.1–A5.6.

What is common to all those schemes is that the reception conditions vary throughout the cell and are usually worst near the boundary (or corner) where the desired signal is the weakest and the interference from other cells is the strongest. Thus most users get "too much" energy in order to accommodate those in the worst conditions. This excessive energy which is transmitted increases the interference and reduces the efficiency of the system. Hence it is desirable to have an adaptive system which will try to equalize the reception quality for all users by making adjustments in transmission. In a single frequency per channel system the former equalization could be done, in principle, with some form of power control.

The problem remaining in the prior art is to provide an adaptive system for the spread spectrum FH-MFSK radio system. Another characteristic of the spread spectrum FH-MFSK system is that the total available bandwidth and the user's data rate constrain the choice of the operating parameters (the number of frequencies and the number of hops per codeword), and any deviation from the optimum choice sharply reduces the system efficiency. Thus the problem remaining in the prior art is to provide better flexibility in system design.

SUMMARY OF THE INVENTION

The foregoing problems have been solved in accordance with the present invention which relates to an adaptive spread spectrum frequency-hopped multilevel frequency shift keyed (FH-MFSK) transmitter and receiver and, more particularly, to an adaptive spread spectrum FH-MFSK transmitter and receiver which permit the control of an associated user's performance by the selective simultaneous transmission of one or more encoded frequencies per time slot for the transmitted sequence such that greater system flexibility is provided for choosing the operating parameter and/or that the performance of users with the worst reception conditions in a system can be improved but at the expense of those users with better reception conditions resulting in an overall increased system efficiency.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention is described hereinafter primarily with the use of $2^K$ frequencies or elements. However, it will be understood that such description is exemplary only and is for the purposes of exposition and not for purposes of limitation. It will be readily appreciated that the inventive concept described is equally applicable for use in systems with any number of frequencies.

Figure 1:
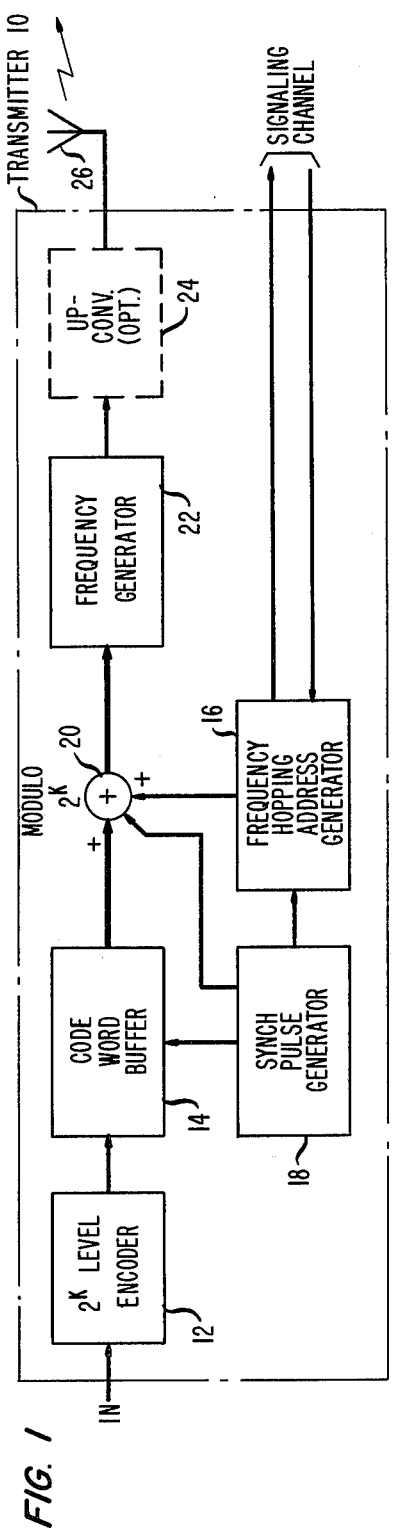
FIG. 1 is a block diagram of an FH-MFSK transmitter in accordance with the present invention.
Figure 1:
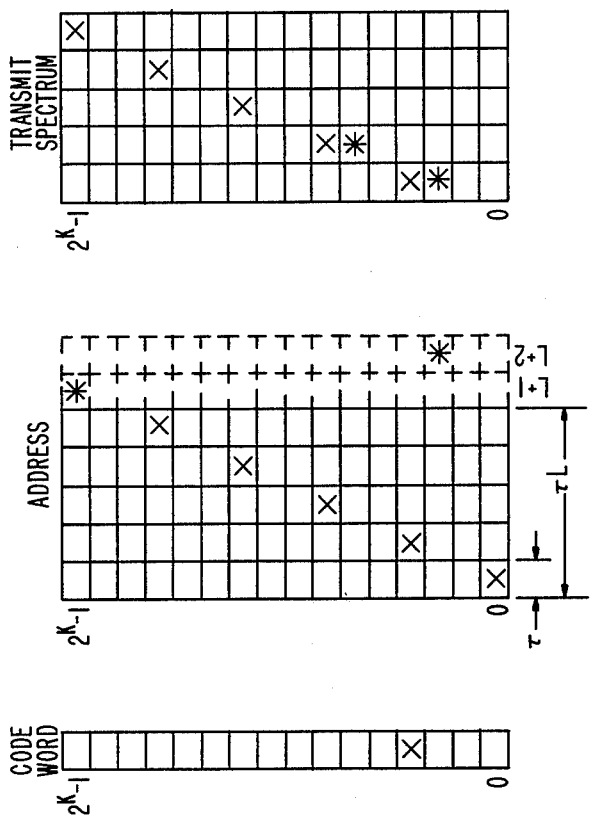

A block diagram of a typical spread spectrum frequency-hopping, multilevel frequency shift keying (FH-MFSK) transmitter for use, for example, in a mobile radio communication system in accordance with the present invention is shown in FIG. 1. The transmitter 10 comprises a $2^K$ level encoder 12 which functions, for example, to periodically sample an analog input signal from a particular system user and convert the amplitude level of each sample into an equivalent $2^K$ bit code word. If, on the other hand, the input signal from the particular system user is in binary form, encoder 12 can operate, for example, to use each group of K sequential bits as the individual $2^K$ bit code word. In either case, the resultant $2^K$ bit code is stored temporarily in a code word buffer 14. An exemplary code word is shown in FIG. 1 below code word buffer 14 and designated "Code Word" where the code word comprises an indication in the $4^{th}$ level (level 3) of a possible 16 levels (0–15), where K=4.

A frequency-hopping address generator 16 functions to generate a unique frequency-hopping address code word which is different for each system user within the same zone or cell. Where interference at the destined receiver is such that the error probability is below a predetermined threshold, the address code word is a sequence of L chips with each chip having a duration of $\tau$ seconds and comprising one level of a $2^K$ level code which can be a different level for each chip of the address word. For example, as shown in the solid-lined portion of the matrix designated "Address" below generator 16 in FIG. 1, an address word for a particular system user may comprise five chips, where L=5, where chips 1–5 are designated code levels 0, 3, 6, 9 and 12, respectively, having a +3 slope within the $2^K$ possible code levels for each chip, where K=4. Where the interference at the destined receiver is such that the error probability is above a predetermined threshold, the error probability can be reduced in accordance with the present invention by the use of a longer (L+N) address sequence where the codes of the N additional chips are superimposed on the first N chips of the L-length address sequence as will be described in greater detail hereinafter. More particularly, in FIG. 1 the codes in the L+1 and L+2 chips of the address, where N=2, are used concurrently with the codes in the first and second chips, respectively, thereby maintaining an L length transmitted sequence.

A synchronizing pulse generator 18 functions to generate pulses from an internal clock for causing the code word indication and each chip code of the L-length address sequence word to be concurrently transmitted to a modulo-$2^K$ adder 20. Adder 20 functions to modulo-$2^K$ add the elements of the code and the address word to generate a new L-length code word as shown in, for example, the matrix designated "Transmit Spectrum" in FIG. 1. It is to be understood that the "*" entries in the Transmit Spectrum matrix only occur when the error probability at the destined receiver is above a predetermined threshold as will be explained in greater detail hereinafter. This resultant new code word is used by a frequency generator 22 to generate a particular one or more of $2^K$ frequencies, within the system's overall bandwidth, for each chip of $\tau$ second duration of the new code word as designated by the presence of an encoded signal in the corresponding level of each chip of the Transmit Spectrum code word. For example, where the destined receiver is operating at an error probability below a predetermined threshold, for the "Transmit Spectrum" matrix of FIG. 1, frequency generator 22 will sequentially transmit a frequency corresponding to the $3^{rd}$, $6^{th}$, $9^{th}$, $12^{th}$ and $15^{th}$ level of the matrix levels 0–15, as indicated by the x's during the $\tau$ second duration of chips 1–5, respectively, where K=4. This sequence of L tones or frequencies can be upconverted by optional upconverter 24 into the proper system transmit frequency spectrum if not already done so by generator 22 for transmission by antenna 26.

It is to be understood that elements 12, 14, 16, 18, 20, 22 and 24 of transmitter 10 can comprise any suitable circuit which will perform the functions indicated hereinbefore. For example, buffer 14 and address generator 16 can comprise memory devices which temporarily store the code word or permanently store the address word, respectively, for accessing at the appropriate time.

In summary, at transmitter 10, K source bits are accumulated in a buffer 14 and held for $L\tau$ seconds while they are added modulo-$2^K$ as a K-bit word to each of the elements of the address word from generator 16. The sums determine the sequence of transmitted frequencies. In this way, K bits are transmitted during the $L\tau$ seconds. Therefore, the elementary signals are a set of $2^K$ tones, each of duration $\tau$ seconds. Each link or user pair in the system is identified by an address which is a sequence of at least L K-bit words. A new code word, conveying K bits, is transmitted every $L\tau$ seconds as a sequence of at least L tones as will be explained in greater detail hereinafter. Each tone is determined by the sum of a K-bit word from the source and a code of one of the K-bit address words.

Figure 2:
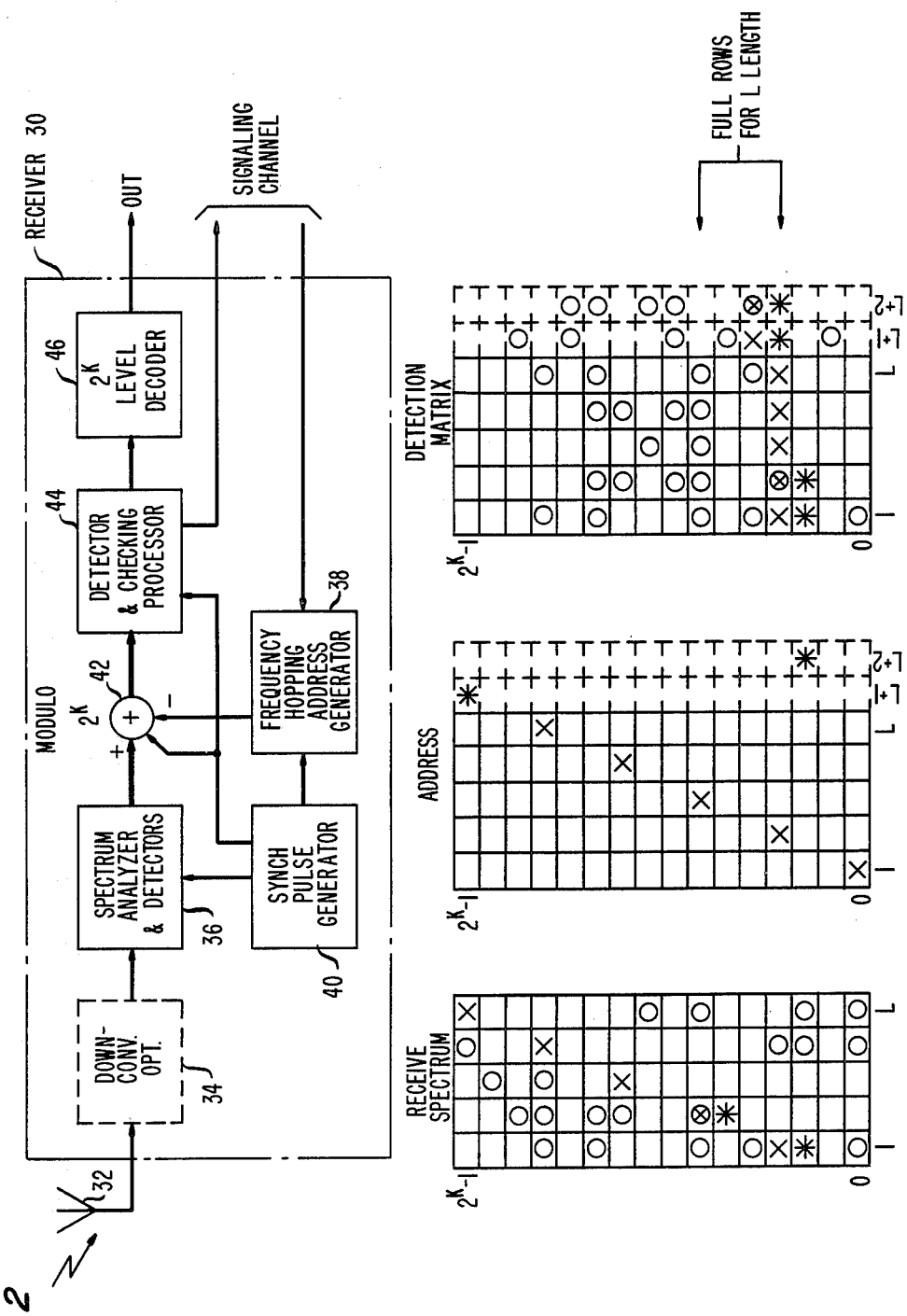
FIG. 2 is a block diagram of an FH-MFSK receiver capable of receiving multiple FH-MFSK signals and choosing a desired user's signal therefrom in accordance with the present invention.

FIG. 2 illustrates a receiver 30 in accordance with the present invention capable of receiving and decoding a FH-MFSK signal transmitted by one or more transmitter of the type shown in FIG. 1. The FH-MFSK signal is received at an antenna 32 and downconverted, if necessary, by an optional downconverter 34 to a proper frequency band prior to further processing. The received or downconverted signal is processed by a spectrum analyzer and detector circuit 36 to determine which of the frequencies or tones are present during each chip interval within the overall bandwidth of the system. The received signal, however, is generally a composite of the time-synchronous tone sequences of a plurality of transmitters. Spectrum analyzer and detector circuit 36 can comprise, for example, a plurality of tone detectors for determining which of the similar plurality of tones are present. Each tone detector then would decide, every $\tau$ seconds, whether the received signal contains energy at a separate distinct one of the plurality of system frequencies to which it is tuned. Alternatively, spectrum analyzer and detector 36 can comprise a spectral estimating transponder as shown in FIG. 2 of the hereinbefore-mentioned article by A. J. Viterbi. In any case it will be understood that spectrum analyzer and detector 36 can comprise any suitable arrangement for detecting the various frequencies present during each chip interval and for generating an appropriate output signal indicating which frequencies are present or not. The matrix of received energy in FIG. 2 shows the transmitted tones of FIG. 1 as shown by the "Xs" and "*s" and the tones, indicated by circles, received from five other links.

The signal from spectrum analyzer and detector 36, during each chip interval, is sent to a modulo-$2^K$ subtractor 42. Under conditions where receiver 30 is normally operating with an error probability below a predetermined threshold and transmitter 10 is using an L length address word, the address code level of each L address chip interval generated by frequency-hopping address generator 38 is modulo-$2^K$ subtracted in modulo-$2^K$ subtractor 42 from the detected levels in the associated $2^K$ frequencies of each corresponding L chip interval of the input signal from spectrum analyzer and detector 36 to generate a Detection matrix shown in FIG. 2.

Under conditions where receiver 30 is normally operating with an error probability above a predetermined threshold and transmitter 10 is using an extended L+N length address word, two address code levels are generated during each of the first N chip intervals by frequency-hopping address generator 38 and are modulo-$2^K$ subtracted, in modulo-$2^K$ subtractor 42, from the detected levels in the associated $2^K$ frequencies of each corresponding N chip intervals of the input signal from spectrum analyzer and detector 36 to generate the first N columns and the last N columns of the L+N Detection matrix. Additionally one address code level is generated during each of the last L−N chip intervals by frequency-hopping address generator 38 and are modulo-$2^K$ subtracted, in modulo-$2^K$ subtractor 42, from the detected levels in the associated $2^K$ frequencies of each corresponding L−N chip interval of the input signal from spectrum analyzer and detector 36 to generate the remaining L−N columns of the L+N Detection matrix shown in FIG. 2. More particularly, during the first chip interval columns number 1 and L+1 of the Detection matrix are generated, during the second chip interval columns number 2 and L+2 of the Detection matrix are generated and during the remaining L−2 chip intervals the corresponding columns of the Detection matrix are generated. The Detection matrix shows the resultant elements from the user of FIG. 1, as indicated by the "Xs" and "*s" and also the elements of the five other links, as indicated by the circles, which resulted from the modulo-$2^K$ subtraction of the same address elements from the received tones or frequency components from those other links.

Figure 3:
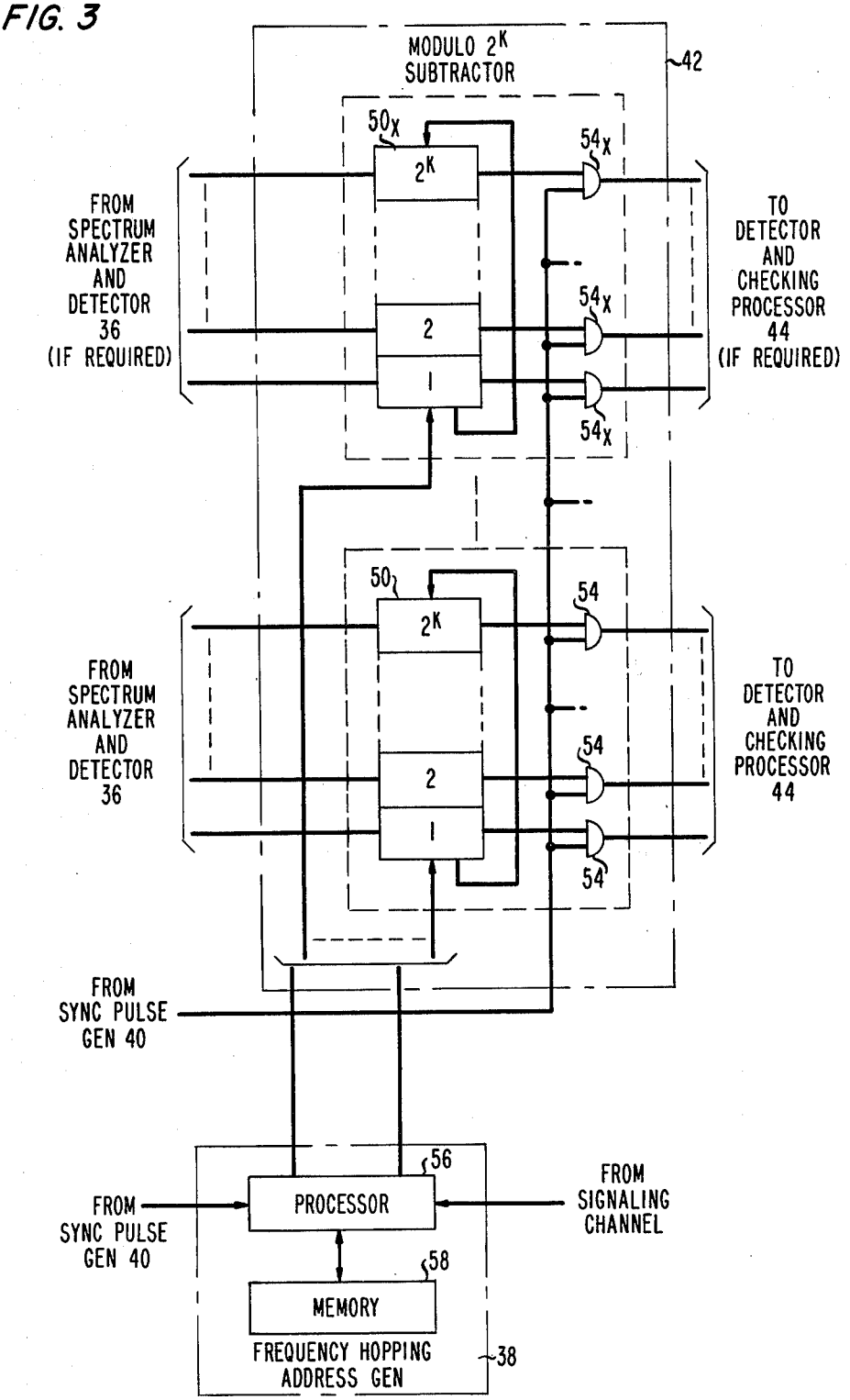
FIG. 3 is a block diagram of an exemplary modulo-$2^K$ subtractor and a frequency-hopping address generator for use in the receiver of FIG. 2.

FIG. 3 is a block diagram of an exemplary modulo-$2^K$ subtractor 42 and a frequency-hopping address generator 38 for use in the receiver of FIG. 2. Such circuitry can similarly be applied to the modulo-$2^K$ adder 20 and the FH address generator 16 in the transmitter of FIG. 1. It is to be understood that the arrangements shown in FIG. 3 are not for purposes of limitation since any other suitable device may be used as, for example, a $2^K$ by $2^K$ switching matrix for the modulo-$2^K$ subtractor 42 which is under the control of the FH address generator 38. The modulo-$2^K$ subtractor 42 shown in FIG. 3 comprises at least two shift registers 50–$50_x$ including $2^K$ stages which can be, for example, concurrently inputted from spectrum analyzer and detector circuit 36 for the $2^K$ frequencies of the associated band or subband, and a plurality of $2^K$ gates 54 which are responsive to an enable pulse from synchronizing pulse generator 40 to gate the contents of shift registers 50–$50_x$ to detector and checking processor 44.

The FH address generator 38 shown in FIG. 3 comprises a memory 58 which stores one or more of the various FH address codes of desired system users and a processor 56 which is responsive to an enable pulse from the synchronizing pulse generator 40 at the start of a message transmission, the first chip interval, and for each successive chip interval for causing processor 56 to transmit the appropriate address count or counts to be subtracted modulo-$2^K$ during each of the L chip intervals for a particular user in accordance with his address code word. For example, for the address shown in the FIG. 2 address matrix, the address generator 38 of FIG. 3 would transmit a 0 and −15 to shift register 50 and $50_x$, respectively, in modulo-$2^K$ subtractor 42, during the first chip interval; −3 and −2 during the second chip interval; and −6, −9, and −12 for each of the 3–5 chip intervals, respectively, if the L+N format was used and N=2.

In operation, the signals from spectrum analyzer and detector circuit 36 are appropriately entered into the appropriate $2^K$ stages of register 50 and $50_x$ during each chip interval of the L sequence, and the associated chip interval signal from FH address generator 38 causes register 50 and $50_x$ to appropriately cyclically shift the contents the amount indicated by generator 38. Once the shifting has been completed, an enable signal from synchronizing pulse generator 40 causes a plurality of $2^K$ gates 54 to concurrently transmit the contents of the $2^K$ stages of register 50 and of register $50_x$, when necessary to detector and checking processor 44. For example, using the address code word in the matrix of FIG. 2, during the first chip interval the contents of register 50 would be shifted downwards modulo-$2^K$ zero stages and the contents of register $50_x$ would be shifted downward modulo-$2^K$ 15 stages before transmission to detector and checking processor 44. During the second chip interval, the contents of registers 50 and $50_x$ would be shifted downwards modulo-$2^K$ three and two stages, respectively, before transmission to detector and checking processor 44. Similarly, the contents stored in register 50 during chip intervals 3–5 would be shifted downwards modulo-$2^K$ a total of 6, 9 and 12 stages respectively, before being gated out to circuit 44. The output of modulo-$2^K$ subtractor 42 in FIG. 2 over the L chip intervals results in a Detection matrix shown in FIG. 2 for a particular user having the address code word shown.

In the absence of transmission impairments, the transmitted code word over an L-length sequence always results in a complete row of entries in the Detection matrix. Errors can occur when the tones from other links combine to form other complete rows as shown in level 6 in the Detection matrix of FIG. 2. It becomes evident that as the number of users increases, the greater becomes the possibility that multiple complete rows might exist. Additionally, thermal noise in the receiver can also influence the Detection matrix since such noise can cause a tone to be detected when no such tone was originally transmitted, also known as a false alarm, or cause a transmitted tone to be omitted which is also known as a deletion. Therefore, as the amount of system users increases the possibility of multiple complete rows also increases, and compounded with possibility of false alarms and deletions makes the choice of the correct one of the $2^K$ levels in the Detection matrix difficult at times.

The output from modulo-$2^K$ subtractor 42 is transmitted to a detector and checking processor 44 where they are further processed. Detector and checking processor 44 interrogates the Detection matrix to determine which of the $2^K$ levels have full rows or, alternatively, a maximum length if no-full rows exist. Where only one level is full or has such maximum length, that level indication is transmitted to a $2^K$ level decoder 46 which converts the indicated level to either a K-bit binary message or an analog signal sample having an amplitude corresponding to the indicated level depending upon the type of reception necessary by the ultimate user. From the Detection matrix of FIG. 2, it can be seen that over the L-length, level 3 is a full row of entries, as generated by the desired user, and also level 6 is a full row of entries, each element being generated by a separate one of the five other interfering users. In this case the checking processor cannot determine which level (level 3 or 6) was transmitted by the desired user and the incorrect one might be chosen resulting in an error. In comparison, if the L+2 length address is transmitted, it can be seen from the Detection matrix of FIG. 2 with the dashed-line portion, that level 3 only is a full row or entries and it is correctly decoded.

In an analysis of system performance, K bits are transmitted every T seconds and the data rate, therefore, is $$R = K/T = (K/L\tau)\text{bit/sec.} \tag{1}$$

The mutual orthogonality of the $2^K$ tones over $\tau$ seconds requires a bandwidth of $$W = (2^K/\tau)\text{Hz.} \tag{2}$$

This yields a design constraint on the system parameters K and L:

$$L = rK2^{-K}, \tag{3}$$

where $$r \triangleq W/R. \tag{4}$$

If M is the maximum number of users which can simultaneously share the system at a given error probability, then the efficiency $\eta$ of the system is defined to be the total rate transmitted through the system per unit bandwidth $$\eta = MR/W = M/r. \tag{5}$$

It is known for the noiseless case that the bit error probability due to mutual interference between M simultaneous users is upperbounded by $$P_b \leq 2^{K-2} p^L \tag{6}$$

where $$p = 1 - (1 - 2^{-K})^{M-1}. \tag{7}$$

Thus even without channel impairments the efficiency of the system, or equivalently the number of users that can simultaneously share the system at a given error probability, is interference limited.

In designing a spread spectrum system the total available bandwidth and the users' rate, or equivalently their ratio r, constrain the choice of the number of frequencies ($2^K$) and the sequence lenth (L) via relation (3). For example, if r=626 the following pairs of (K,L) are possible: (7,34), (8,19), (9,11), (10,6) and (11,3). Substituting equation (3) into the expression (5), for the bit error probability for the noiseless case and a similar expression for the noisy case, yields the optimum pair, i.e., the one which maximizes the number of users which can operate at a given error probability. In the above example, the optimum pair for bit error probability of $10^{-3}$ (noiseless case) is K=9 (512 frequencies) and L=11.

Suppose it is desired to reduce the error probability of a particular user. This could have been done if there was a way to increase the length of the user's sequence since the error decreases exponentially with L. There are, however, only L time slots (chips) during the transmission time T of a user's K-bit message. In accordance with the present invention, an effective increased sequence length is achieved by transmitting two frequencies per time slot on N chips and one frequency on the remaining L−N chips, the performance is almost that of an equivalent sequence of length L+N. For the other users this causes a slight degradation, due to increased interference which is negligible compared to the improvement obtained by the particular user.

In evaluating the performance of the system under intercell interference conditions, it is clear that the users with the worst reception conditions (usually near the cell boundary) limit the system efficiency and an improvement in their performance, even at the expense of those near the center, is warranted. When the error probability exceeds a predetermined threshold, e.g., more then a predetermined number of levels are filled in the Detection matrix of FIG. 2, detector and checking processor 44 at receiver 30 transmits a signal via a signaling channel to transmitter 10 with which it is associated to inform it of such condition. Such signal is received at the processor of the frequency-hopping address generator 16 of the associated transmitter 10 which causes generator 16 to extend the L address sequence by N chips for transmissions to that receiver. The number of additional chips to be used may be a fixed amount or dependent on how far the predetermined threshold at receiver 10 has been exceeded. Generator 16 at the transmitter 10 can then inform generator 38 at receiver 10 via the signaling channel that such extended transmission is taking place and, where N may be other than a fixed number, the number of chips (N) that the address is extended.

In operation then, transmitter 10 generates a sequence of length L+N, using an address of L+N K-bit words. The transmitted sequence is obtained by folding the last N chip over the first N chips, i.e., at chip number one the two frequencies corresponding to the first and L+1 chip are transmitted and so on. Thus transmitter 10 transmits two frequencies per chip during the first N, chips and a single frequency per chip during the remaining L−N chips. At receiver 30, the received matrix is decoded using the address of length L+N. It can be seen from FIG. 2 that, by extending the L length address sequence by 2 chips at transmitter 10 and receiver 30, only level 3 has a complete row in the Detection matrix over the L+N sequence and, therefore, the performance of the system can be substantially improved. It is to be understood that other receivers using only the L-length address sequence and operating below the error probability threshold will suffer a slight degradation due to the additional tones transmitted by the transmitters using the L+N format, but an overall increased system efficiency is obtained.

It is to be understood that in receiver 30, when an L+N format is used, the actual steps of the processing sequence shown in, and described hereinbefore for, the receive spectrum, address and detection matrices can be modified. For example, when the information for chip 1 from detector 36 is received, this information can be processed in modulo-$2^K$ subtractor 42 using only one shift register 50 and generating in sequence the address codes for chip 1 and chip L+1 at twice the speed, that is each address code is processed during half the chip interval ($\tau/2$) so that both are processed during the first chip interval prior to sequentially processing the information of chip 2 with the address codes for chips 2 and L+2 followed by the processing of chips 3–5.

From the foregoing description, it is within the scope of the present invention to provide an adaptive system wherein the users within a cell can be divided into J groups, where $1 < J \leq L$, ordered according to the number of two-frequency chips, i.e., $$0 = N_1 < N_2 < \ldots < N_J = L \qquad (8)$$

Thus a user in group $j+1$ has a higher capability than a user in group $j$. This increased capability can compensate for worse external reception conditions, e.g., intercell interference. The adaptive system can monitor the overall quality of all users via the signaling channel and try to make it equal by moving each user to a higher or lower group when necessary. In general, in an adaptive system, users can be expected to be transferred to a higher and higher group as they move towards the cell boundary and vice versa. It can be shown that compared to a conventional system with fixed capability to all users, an adaptive system can accommodate a larger number of users at a given error probability.

In an alternative embodiment of the present invention, a modified FH-MFSK system can be provided where all users transmit several frequencies per chip. Although there is a similarity to the adaptive system described hereinbefore where a transmission of one or more frequencies per chip is provided, a different problem can be addressed and overcome with this alternative embodiment, namely achieving a better flexibility in system design.

As mentioned before, the total available bandwidth and the users' data rate constrain the choice of the number of frequencies and the sequence length via equation (3), and there is an optimum choice of (K,L) which maximizes the efficiency. There might be other considerations, when designing the system, which would favor changing these parameters. For example, there is a chip synchronization error due to multipath, and the performance depends on the relative synchronization error (with respect to the chip duration). Decreasing the number of chips (i.e., increasing chip duration) reduces this relative error. Thus flexibility in the choice of system parameters is desirable and, in accordance with the present invention, by allowing each user to transmit two or more frequencies per time slot this flexibility is obtained and thereby improves system performance.

Figure 4:
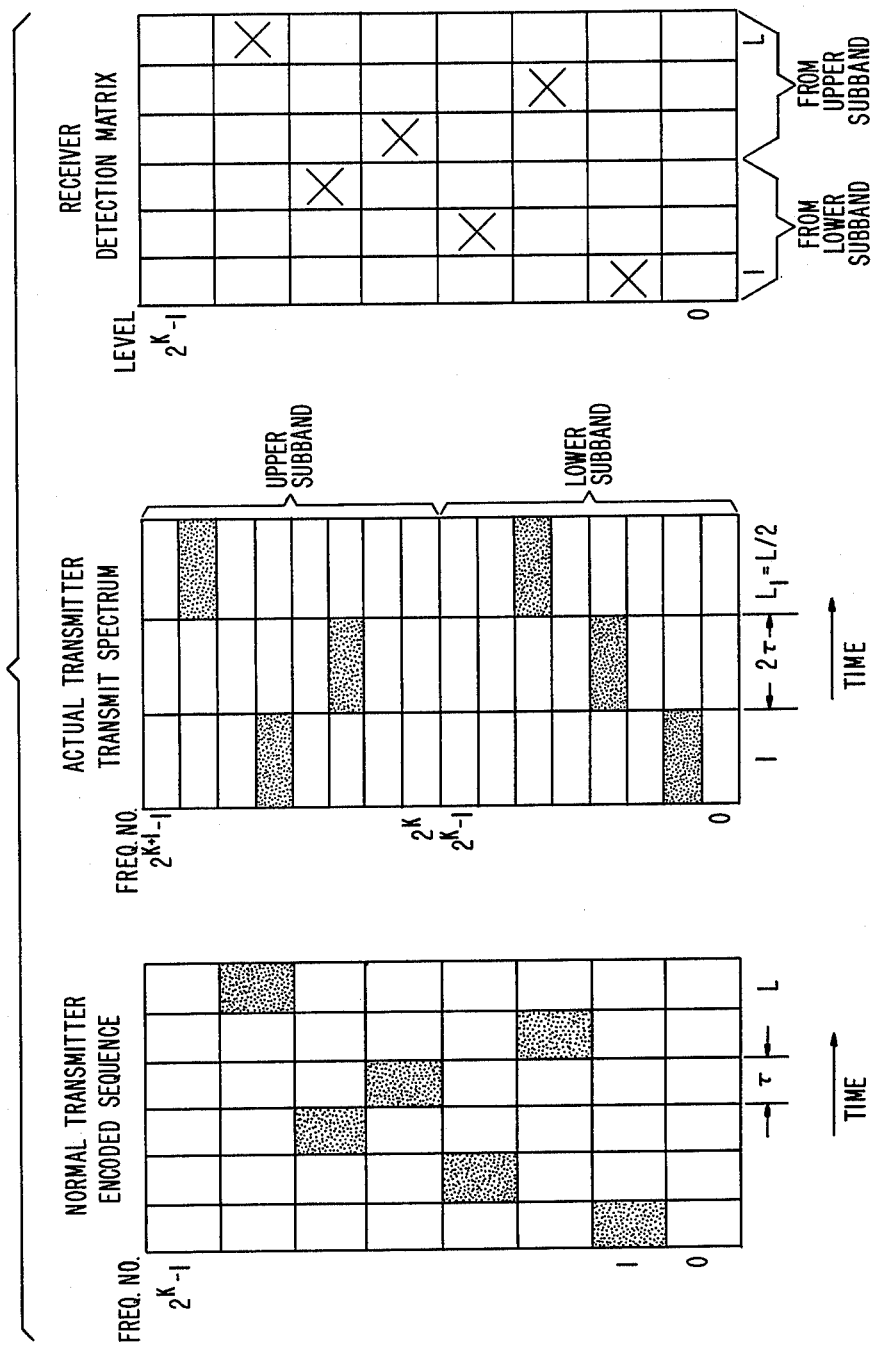
FIG. 4 illustrates a transmission sequence of L tones in accordance with the present invention using L/2 time slots and $2^{K+1}$ frequency slots for transmission and reception in the arrangements of FIGS. 1 and 2.
Figure 5:
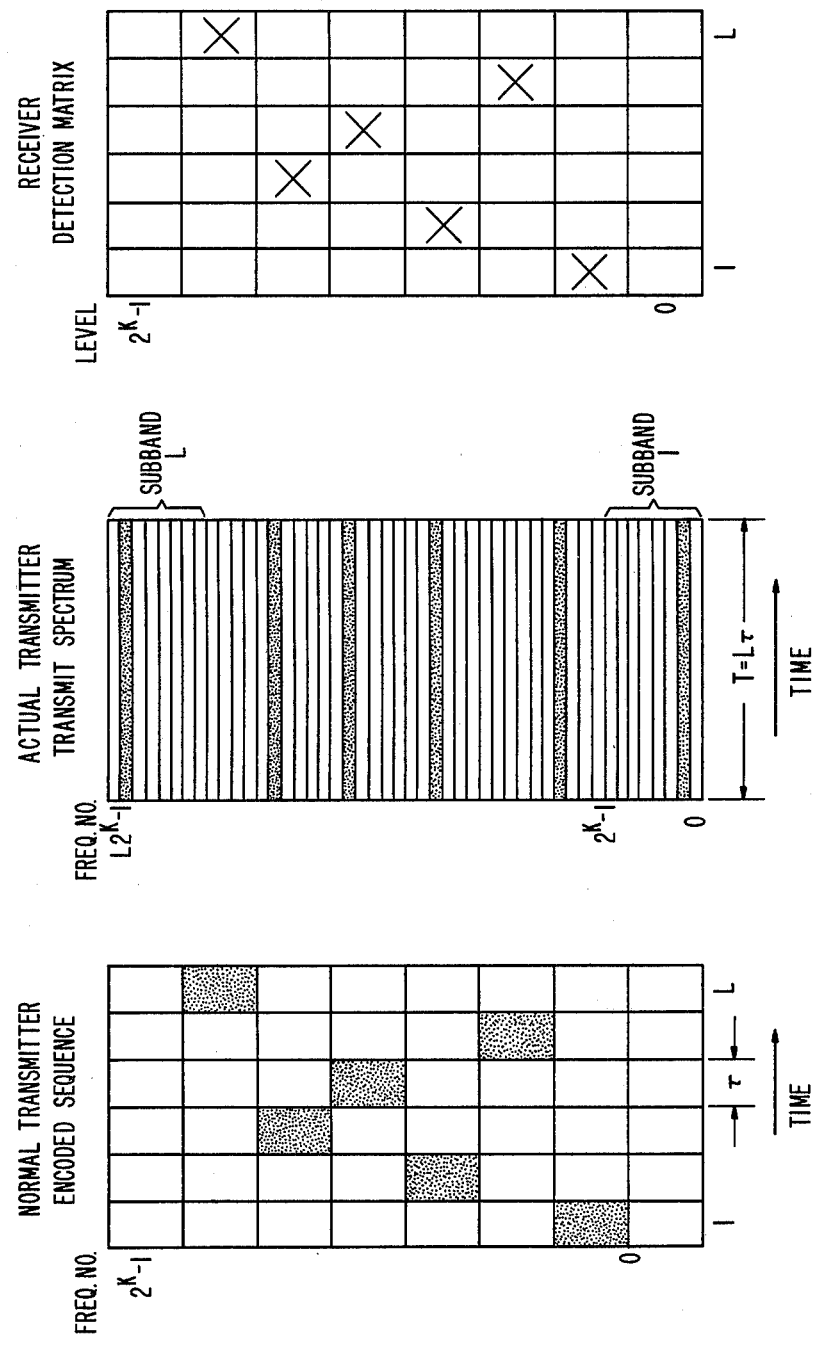
FIG. 5 illustrates the simultaneous transmission of a sequence of L tones using L subbands with $2^K$ frequency slots per subband in accordance with the present invention.

The implementation of the alternate embodiment is typically shown in FIGS. 4 and 5 using the arrangements of FIGS. 1 and 2 where the frequency band is divided into several subbands of $2^K$ frequencies each and each user transmits one frequency per subband per chip. For purposes of illustration a conventional scheme with $2^K$ frequencies and $L=6$ chips is shown in the matrix designated "Normal Transmitter Encoded Sequence" in FIGS. 4 and 5 and represent a sequence which might be generated by frequency generator 22 of FIG. 1 in normal arrangements.

In accordance with the alternative embodiment, L is divided into x sections of $L_1$ chips each, where x divides equally into L and also represents the number of subbands to be used. In FIG. 4, x is chosen to equal 2 and since L has been chosen to equal 6, $L_1 = 3$. Therefore, in accordance with the present invention, the total frequency band of the exemplary arrangement is divided into two subbands with each subband containing $2^K$ frequency slots as shown in the matrix designated "Actual Transmitter Transmit Spectrum" in FIG. 4. In operation, each user transmits his encoded sequence of length L by, for example as shown in FIG. 4, transmitting the encoded level of the first $L_1$ chips (chips 1-3) in corresponding ones of the $2^K$ frequencies of the lower subband and the encoded levels of the latter $L_1$ chips (chips 3-6) in corresponding ones of the $2^K$ frequencies of the upper subband. At receiver 30, the two subbands are detected in detector 36 and combined by processor 44 to yield the original $2^K \times L$ encoded sequence as shown in the "Detection Matrix" of FIG. 4.

The result is a system with twice the number of frequencies; half the number of chips, where the duration of each chip is twice as long as the chip of the original $2^K \times L$ sequence; and two frequencies per chip. Additionally, the performance is found to be the same as that of the conventional scheme of transmitting L chips. In the extreme case, one chip of duration T will be used with $L2^K$ frequencies that are divided into L subbands as shown in FIG. 5. There, each user transmits his L frequency sequence simultaneously, a separate frequency in each of the L subbands. The receiver, in turn, performs one spectral analysis of the single chip in detector 36 to determine which of the $L2^K$ frequency cells contain energy, and the original $2^K \times L$ received detection matrix is generated by processor 44.

In light of the foregoing discussion, it is to be understood that in such a system each of the chips of the encoded sequence can be transmitted in any of the subbands. For example, in FIG. 4 the first three chips of the encoded sequence could be transmitted in the upper subbands and the last three chips of the encoded sequence could be transmitted in the lower subband. A similar technique could be applied to the transmission of the L chips in the L subbands of FIG. 5. The only requirement would be that the transmission format be communicated to the receiver via the signaling channel to enable the ultimate generation of the original $2^K \times L$ matrix.

It is to be further understood that it is within the scope of the present invention to combine the techniques described hereinbefore for the embodiments of FIGS. 1-5. For example, when using a single set of $2^K$ frequencies, all users could generate sequences of length nL and transmit n frequencies per chip. For such condition, at the receiver each chip would be demodulated n times to generate a $2^K \times nL$ detection matrix. Alternatively, the total frequency band could be divided into j subbands which are used to transmit n frequencies per subband per chip. The result is a system with $j2^K$ frequencies and L/j chips.

It is to be understood that the above-described embodiments are simply illustrative of the principles of the invention. Various other modifications and changes may be made by those skilled in the art which will embody the principles of the invention and fall within the spirit and scope thereof. For example, for implementing the techniques shown in FIGS. 4 and 5, the addition in adder 20 of FIG. 1 of each of the elements of the address sequence can be done sequentially with the code word and then delivered to frequency generator 22 via appropriate memory or delay means to permit generator 22 to simultaneously transmit the appropriate 2 or more encoded signals during a predetermined chip interval. Alternatively, modulo-$2^K$ adder 20 (and subtractor 42) can comprise x $2^K$ shift registers, as shown for shift register 50 by optional register $50_x$ in FIG. 3, with each shift register being associated with a different one of the x subbands and receiving signals from address generator 16 associated with the appropriate chip of the address sequence. In this manner the codes for the x subbands can be simultaneously delivered to frequency generator 22 for each chip for concurrent transmission.

What is claimed is:

1. A transmitter for use in a spread spectrum radio system for generating a frequency-hopping, multilevel frequency shift keyed (FH-MFSK) signal in a predetermined frequency band, the transmitter comprising:

a Q level encoder (12) capable of converting either a periodic sample of an analog message signal or a group of K sequential message bits of a binary signal to be transmitted into an equivalent level of a Q level code and generating an output signal indicative of such equivalent level;

a frequency-hopping address generating means (16) capable of appropriately generating, as an output signal, signals representative of the individual multiple elements of a predetermined length frequency-hopping address sequence which is associated with a particular user of the system whose message signals were converted by the Q level encoder;

adding means (20) capable of adding the output signal of the Q level encoder and each of the individual multiple elements in the output signal of the frequency-hopping address generating means and generating an output signal indicative of such addition; and frequency generating means (22) capable of transmitting the output signals of the adding means within the appropriate time slots and at corresponding ones of at least Q encoded frequencies within the radio system's predetermined frequency band characterized in that the address generating means (16) comprises:

storage means (58) capable of storing the individual multiple elements of the predetermined length frequency-hopping address sequence for a user, the sequence comprising at least L signals where L is the normal length of a system encoded transmitted sequence; and processing means (56) capable of transmitting the multiple elements of the frequency-hopping address sequence in a predetermined sequence to the adding means; and the frequency generating means is responsive to the output signals from the adding means for causing, during a predetermined at least one time slot of the transmitting sequence, the simultaneous transmission of the resultant signal of the addition in said adding means of the Q level encoded signal and at least two elements of the frequency-hopping address sequence in corresponding encoded frequencies within the predetermined frequency band of the system.

2. A transmitter according to claim 1 characterized in that the storage means (58) is capable of storing an $L+N$ length address sequence for each associated user; and the processor (56) is capable of being responsive to a first signal from a remote receiver with which the transmitter is to communicate indicating that said receiver is experiencing interference from other transmitters of the system below a predetermined threshold level for providing the L-length sequence portion of the address sequence to said adding means, and being responsive to a second signal from said remote receiver indicating that said receiver is experiencing interference above said predetermined threshold level for providing an $L+N_1$ length address sequence to said adding means, where $N_1 \leq N$; and the frequency generating means is capable of being both responsive to the first signal from said remote receiver for transmitting the resultant signals of the addition of the Q level encoded signal and each of the L-length address sequence elements in the adding means in separate time slots of an L-length transmitted sequence, and responsive to the second signal from said remote receiver for transmitting the resultant signals of the addition of the Q level encoded signal and each of the $L+N_1$ length address sequence by the adding means in an L-length transmitted sequence where the $N_1$ encoded time slot signals are simultaneously transmitted with the first $N_1$ time slot signals of the L-length transmitted sequence.

3. A transmitter in accordance with claim 2 characterized in that the second signal from said remote receiver is divided into Y possible subsignals of increasing value representative of separate increasing levels of interference at said remote receiver; and the processor is responsive to each of the Y subsignals for providing a separate number of $N_1$ elements of the $L+N_1$ length address sequence where $N_1$ increases in number as the Y signals indicate an increasing interference level and $N_1$ decreases in number as the Y signals indicate a decreasing interference level at the remote receiver.

4. A transmitter according to claim 1 characterized in that the predetermined length of the address sequence stored in the storage means of the address generating means equals L elements; and the frequency generating means is capable of simultaneously transmitting during a single time slot each of the resultant signals of the separate addition by the adding means of the Q level encoded signal and each of x elements of the L-length address sequence in a corresponding encoded frequency of a separate one of x frequency subbands, of Q separate frequencies each, forming the system predetermined frequency band, where $x \leq L$.

5. A transmitter according to claim 4 characterized in that the L elements of the address sequence stored in the storage means are divided into x equal sections of adjacent elements;

the processing means is capable of concurrently transmitting corresponding elements of each of said x sections to the adding means during a time slot period; and the adding means comprises means ($50$, $50_x$, $54$, $54_x$) capable of separately adding each of the x elements concurrently received from said processing means to the Q level encoded signal and for generating an output signal to the frequency generating means indicative of the result of the x concurrent additions for concurrent transmission in said x subbands.

6. A method of transmitting signals between a transmitter and a remote receiver in a spread spectrum radio system which uses frequency-hopping, multilevel frequency shift keyed (FH-MFSK) signals in a predetermined system frequency band, the method comprising the steps of:

(a) converting either a periodic sample of an analog message signal or a group of K sequential message bits of a binary signal to be transmitted into an equivalent level of a Q level code first signal;

(b) generating a second signal representative of the individual multiple elements of a predetermined length frequency-hopping address code sequence which is associated with a particular user of the system whose message signal was converted in step (a);

(c) adding the first signal and each of the elements of the second signal for generating a third signal indicative of each of such additions; and (d) transmitting the multiple elements of the third signal within appropriate time slots of the frequency-hopping signal and at corresponding ones of at least Q encoded frequencies within the system's predetermined frequency band characterized in that the method comprises the further step of:

(e) in performing step (d), concurrently transmitting the resultant separate additions of the first signal and each of at least two elements of the multiple elements forming the second signal during at least one time slot of the transmitted sequence in corresponding encoded frequencies within the predetermined frequency band of the system.

7. The method according to claim 6 characterized in that the predetermined length frequency-hopping address code sequence comprises L+N elements, where L is the normal length of a system transmitted encoded sequence; the method comprising the further step of:

(f) in performing step (e), performing the steps of:
   (1) in response to a first control signal from the remote receiver indicating that said receiver is experiencing interference from other transmitters of the system below a predetermined threshold level, transmitting the resultant signals of the addition of the first signal from step (a) and each of the L elements of the L+N length address sequence, performed in step (c), in separate time slots of an L-length system transmitted encoded sequence; and
   (2) in response to a second control signal from said remote receiver indicating that said receiver is experiencing interference from other transmitters of the system above said predetermined threshold level, transmitting the resultant signals of the addition of the first signal from step (a) and each of the elements of an $L+N_1$ length address sequence, performed in step (c), where the $N_1$ encoded time slot signals are concurrently transmitted with the first $N_1$ time slots of the L-length transmitted system encoded sequence and $N_1 \leq N$.

8. The method according to claim 7 characterized in that the second control signal from said remote receiver is divided into Y possible subsignals of increasing value representative of increasing levels of interference at said remote receiver, the method comprising the additional step of:

(g) in performing step (f)(2), in response to each of the Y possible subsignals of said second control signal, transmitting the L-length system encoded sequence using an increased number of $N_1$ elements as the level of interference at said receiver increases and using a decreased number of $N_1$ elements as the level of interference at said receiver decreases.

9. The method according to claim 6 characterized in that the method comprises the additional step of:

(f) in performing step (e), concurrently transmitting, during a single time slot of the transmitted encoded sequence, each of the resultant signals of the separate addition in step (c) of the first signal obtained in step (a) and each of x elements of an L-length address sequence in a corresponding encoded frequency of a separate one of x frequency subbands forming the system predetermined frequency band, where each subband comprises Q frequencies each and $x \leq L$.

10. The method according to claim 9 characterized in that the L elements of the address sequence are divided into x equal sections of adjacent elements and the method comprises the further step of:

(g) in performing step (f), concurrently transmitting the resultant signals of the separate addition in step (c) of the first signal obtained in step (a) and each of x elements of said L-length address sequence where the x elements are corresponding elements of each of said x equal sections.

11. A receiver (30) for use in a spread spectrum radio system, the receiver capable of receiving one or more frequency-hopping, multilevel frequency shift keyed (FH-MFSK) signals which were remotely transmitted by modulating a separate one of a plurality of different predetermined length frequency-hopping address sequences with each user's separate signal sample where each signal sample is encoded as one of Q possible frequencies; the receiver comprising:

spectrum analyzing means (36) capable of generating, in response to a received signal, an output signal indicating each of the possible frequencies in the received FH-MFSK signal during each time slot period thereof;

a frequency-hopping address generating means (38) capable of appropriately generating, as an output signal, signals representative of the individual multiple elements of a predetermined length frequency-hopping address sequence which is associated with a particular user of the system whose message signals were received in the FH-MFSK signal;

means (42) capable of demodulating the output signal from the spectrum analyzing means with the address sequence from the frequency-hopping address generating means to generate output signals indicating a set of decoded signals; and a processor (44) comprising means capable of forming and storing the set of decoded signals forming a detection matrix of interest and determining which of Q levels of the decoded signals in the detection matrix have a maximum number of frequency indications over an at least L-length decoded sequence characterized in that the demodulating means is responsive to the reception of a FH-MFSK signal from a user whose signal is to be decoded which, during a time slot period, includes at least two of that user's encoded frequency signals for separately demodulating an associated Q level section of the FH-MFSK signal containing each of the two encoded frequency signals received during said time slot period with each of the associated elements of the frequency-hopping address sequence.

12. A receiver according to claim 11 characterized in that
the frequency-hopping address generating means comprises means capable of (a) storing an $L+N$ length address sequence for each user associated with that receiver, and (b) in response to the reception of a desired L-length FH-MFSK signal during periods when the receiver is experiencing interference below a predetermined threshold level from the transmitters of the system for providing only L elements of the $L+N$ length address sequence in a predetermined sequence to the demodulating means, and in response to the reception of an $L+N_1$ length FH-MFSK signal during periods when the receiver is experiencing interference levels above said predetermined threshold level for providing the associated elements of an $L+N_1$ length address sequence in a predetermined sequence to the demodulating means, where $N_1 \leq N$.

13. A receiver according to claim 12 characterized in that
the storage and providing means of the address generating means is further capable of (c) providing an increasing number of $N_1$ elements of the $L+N$ address sequence as the interference level from all transmitters increases to a successively higher predetermined level above the predetermined threshold level and (d) for providing a decreasing number of $N_1$ elements of the $L+N$ length address sequence as the interference level decreases to a successively lower predetermined level above said predetermined threshold level.

14. A receiver according to claim 11 characterized in that
the predetermined length of the frequency-hopping address sequence equals L elements; and
the frequency-hopping address generating means includes means (56) capable of concurrently generating x elements of the L-length address sequence of a particular user in an appropriate time period to the demodulating means; and
the demodulating means comprises means (50, $50_x$) capable of receiving a spectrum analyzed FH-MFSK signal comprising x encoded elements of a particular users message signal, where each of the x elements is encoded as one of Q frequencies in a separate one of x frequency subbands forming a predetermined system frequency band, and demodulating each of the x concurrently received elements of the received signal with the associated x concurrently received elements from the frequency-hopping address generating means during a transmission sequence time slot period.

15. A receiver according to claim 14 characterized in that
the L elements of the L-length frequency-hopping address sequence are divided into x equal sections of adjacent elements; and
the generating means (56) of the frequency-hopping address generating means is capable of concurrently transmitting to the demodulating means, during an associated time slot period, the associated corresponding elements of each of said x sections of the address sequence.

* * * * *